United States Patent
Kurita et al.

(10) Patent No.: US 12,550,201 B2
(45) Date of Patent: Feb. 10, 2026

(54) RADIO COMMUNICATION NODE

(71) Applicant: NTT DOCOMO, INC., Tokyo (JP)

(72) Inventors: Daisuke Kurita, Tokyo (JP); Hiroki Harada, Tokyo (JP); Weiqi Sun, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 387 days.

(21) Appl. No.: 18/007,204

(22) PCT Filed: Jul. 30, 2020

(86) PCT No.: PCT/JP2020/029305
§ 371 (c)(1),
(2) Date: Jan. 27, 2023

(87) PCT Pub. No.: WO2022/024314
PCT Pub. Date: Feb. 3, 2022

(65) Prior Publication Data
US 2023/0345555 A1    Oct. 26, 2023

(51) Int. Cl.
*H04W 76/10* (2018.01)
*H04W 72/0446* (2023.01)
*H04W 72/0453* (2023.01)
*H04W 88/08* (2009.01)

(52) U.S. Cl.
CPC ....... *H04W 76/10* (2018.02); *H04W 72/0446* (2013.01); *H04W 72/0453* (2013.01); *H04W 88/08* (2013.01)

(58) Field of Classification Search
CPC ..... H04W 92/20; H04W 16/26; H04W 76/10; H04W 72/0446; H04W 72/0453; H04W 88/04; H04W 88/08; H04B 7/15542
See application file for complete search history.

(56) References Cited

U.S. PATENT DOCUMENTS

| | | | |
|---|---|---|---|
| 2021/0298000 A1* | 9/2021 | Park | H04W 72/23 |
| 2022/0167331 A1* | 5/2022 | Huang | H04W 72/20 |
| 2022/0174670 A1* | 6/2022 | Liu | H04L 5/0044 |
| 2022/0182977 A1* | 6/2022 | Miao | H04W 72/0446 |
| 2022/0191893 A1* | 6/2022 | Miao | H04W 72/20 |
| 2022/0279511 A1* | 9/2022 | Kowalski | H04W 72/20 |
| 2023/0262759 A1* | 8/2023 | Hooli | H04W 72/52 370/329 |

(Continued)

OTHER PUBLICATIONS

International Search Report issued in PCT/JP2020/029305 on Dec. 8, 2020 (2 pages).

(Continued)

*Primary Examiner* — Brian D Nguyen
(74) *Attorney, Agent, or Firm* — Osha Bergman Watanabe & Burton LLP

(57) ABSTRACT

A radio communication node receives resource information indicating a type of resources allocated to a radio link with a lower node from a network and establishes the radio link based on the resource information. The type of resources includes a specific type that can designate availability of a frequency resource in a frequency direction. When the frequency resource is the specific type, the radio communication node can receive the resource information indicating the availability of the frequency resource.

6 Claims, 12 Drawing Sheets

DU resource configuration in Rel-16

(56) References Cited

U.S. PATENT DOCUMENTS

2023/0345553 A1* 10/2023 Maya ............... H04W 56/0045

OTHER PUBLICATIONS

Written Opinion of the International Searching Authority issued in PCT/JP2020/029305 on Dec. 8, 2020 (4 pages).
3GPP TS 38.213 V16.2.0; "3rd Generation Partnership Project; Technical Specification Group Radio Access Network; NR; Physical layer procedures for control (Release 16)"; Jun. 2020 (176 pages).
3GPP TS 38.213 V16.1.0; "3rd Generation Partnership Project; Technical Specification Group Radio Access Network; NR; Physical layer procedures for control (Release 16)"; Mar. 2020 (156 pages).
3GPP TR 38.874 V16.0.0; "3rd Generation Partnership Project; Technical Specification Group Radio Access Network; NR; Study on Integrated Access and Backhaul (Release 16)"; Dec. 2018 (111 pages).
Office Action issued in Japanese Patent Application No. 2022-539914, mailed on Aug. 27, 2024 (9 pages).
Office Action issued in Chinese Application No. 202080104765.3, mailed Dec. 24, 2024 (8 pages).
Office Action issued in Japanese Application No. 2022-539914, mailed Jan. 21, 2025 (7 pages).
Office Action issued in Chinese Patent Application No. 202080104765.3, mailed on May 6, 2024 (13 pages).
Office Action issued in Chinese Patent Application No. 202080104765.3, dated Apr. 30, 2025 (16 pages).
Office Action issued in Chinese Patent Application No. 202080104765.3, mailed on Aug. 29, 2025 (16 pages).

* cited by examiner

DU resource configuration in Rel-16 e.g. "1" means IA
Frequency availability indicator : 0 1 1

Option2-1: Frequency availability indicator : 011  001  010  111
Option2-2: Frequency availability indicator : 0001  1011  1101

Example of dynamic indication for soft freq.
resource (for the resources shaded)

INA

INA     IA

IA

Option2-1: Frequency availability indicator : 0  1 1 0

Option2-2: Frequency availability indicator : 1  0 1  0

Option1: T-F availability indicator : 10 110 01

Option2: T-F availability indicator : 1 110 001

DU resource configuration in Rel-16

Example of dynamic indication for soft T-F resource (for the resources shaded)

IA  INA
    INA

RADIO COMMUNICATION NODE

TECHNICAL FIELD

The present disclosure relates to a radio communication node that configures radio access and radio backhaul.

BACKGROUND ART

In the 3rd Generation Partnership Project (3GPP), specifications of 5th generation mobile communication systems (also called 5G, New Radio (NR) or Next Generation (NG)) are in progress, and furthermore, the next-generation specifications called Beyond 5G, 5G Evolution, or 6G are in progress.

For example, in a radio access network (RAN) of the NR, integrated access and backhaul (IAB) in which radio access to a terminal (user equipment (UE)) and radio backhaul between radio communication nodes such as a radio base station (gNB) are integrated is defined (see Non Patent Literature 1).

In the IAB, an IAB node includes a mobile termination (MT) that is a function to connect to a parent node (may be called an IAB donor) and a distributed unit (DU) that is a function to connect to a child node or UE.

In 3GPP Release 17, in a radio link (Link_parent) between the parent node and the IAB node, that is, the MT, and a radio link (Link_child) between the IAB node and the child node, that is, the DU, it is scheduled to support simultaneous transmission and reception using frequency division multiplexing (FDM).

CITATION LIST

Non Patent Literature

Non Patent Literature: 3GPP TS 38.213 V16.1.0, 3rd Generation Partnership Project; Technical Specification Group Radio Access Network; NR; Physical layer procedures for control (Release 16), 3GPP, March 2020

SUMMARY OF INVENTION

However, the realization of the simultaneous transmission and reception in the MT and the DU using the FDM as described above has the following problems. Specifically, the radio communication node that constitutes the IAB node cannot determine whether or not a DU resource (specifically, frequency resource) allocated to the Link_child can be applied to the simultaneous transmission and reception with the MT using the FDM.

In particular, in the case of a Soft (S) resource that can be dynamically designated as available or not available, it is difficult for the IAB node to determine whether the frequency resource can be applied to the simultaneous transmission and reception with the MT using the FDM.

Therefore, the following disclosure has been made in view of such a situation, and provides a radio communication node capable of more reliably executing simultaneous transmission and reception using FDM in MT and DU even when a frequency resource such as the Soft that can dynamically designate "available" or "not available" is used.

According to one aspect of the present disclosure, a radio communication node (radio communication node 100B) includes a receiving unit (radio receiving unit 162) configured to receive resource information indicating a type of resource allocated to a radio link with a lower node from a network, and a control unit (control unit 190) configured to establish the radio link based on the resource information, in which the type includes a specific type capable of designating whether a frequency resource in a frequency direction is available, and the receiving unit receives the resource information indicating availability of the frequency resource when the frequency resource is the specific type.

According to one aspect of the present disclosure, a radio communication node (radio communication node 100B) includes a receiving unit (radio receiving unit 162) configured to receive resource information indicating a type of resource allocated to a radio link with a lower node from a network, and a control unit (control unit 190) configured to establish the radio link based on the resource information, in which the type includes a specific type capable of designating availability of a frequency resource in a frequency direction, and the control unit allocates the frequency resource to the radio link with the lower node when the frequency resource of the specific type is not allocated to the radio link with the higher node.

BRIEF DESCRIPTION OF DRAWINGS

FIG. 10 is a diagram illustrating a configuration example of a DU resource according to operation example 1-2a.

FIG. 11 is a diagram illustrating a configuration example of a periodic DU resource according to operation example 1-2 and operation example 1-2a.

FIG. 14 is a diagram illustrating a configuration example of a DU resource according to operation example 2a.

DESCRIPTION OF EMBODIMENTS

Figure 1:
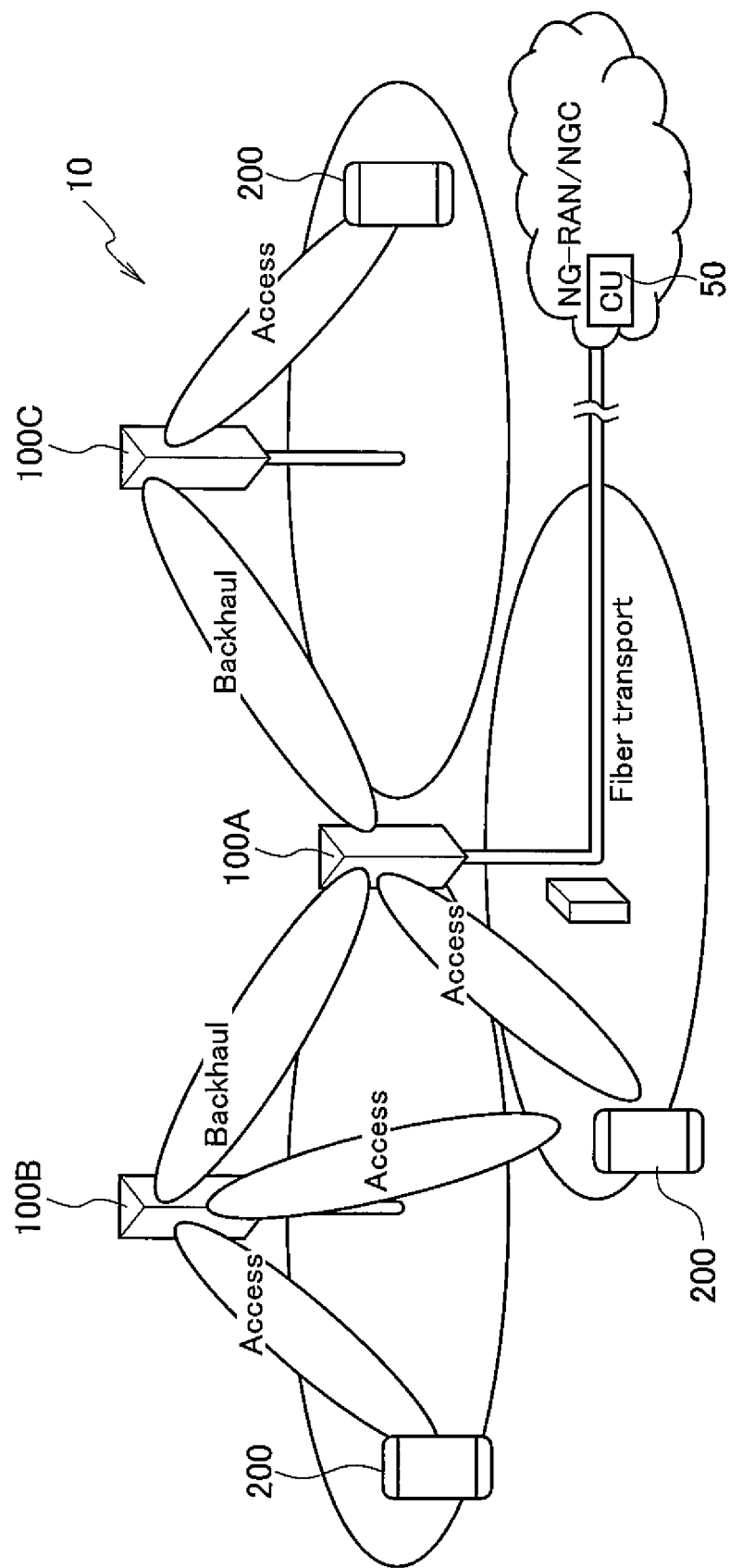
FIG. 1 is an overall schematic configuration diagram of a radio communication system 10.

Hereinafter, embodiments will be described with reference to the drawings. Note that the same functions or configurations will be denoted by the same or similar reference numerals, and a description thereof will be appropriately omitted.

(1) Overall Schematic Configuration of Radio Communication System

FIG. 1 is an overall schematic configuration diagram of a radio communication system 10 according to the present embodiment. The radio communication system 10 is a radio communication system according to 5G New Radio (NR) and is constituted by a plurality of radio communication nodes and terminals.

Specifically, the radio communication system 10 includes radio communication nodes 100A, 100B, 100C, and a user terminal 200 (hereinafter, UE 200).

The radio communication nodes 100A, 100B, and 100C can configure radio access with the UE 200 and radio backhaul (BH) between the radio communication nodes. Specifically, backhaul (transmission line) by a radio link is configured between the radio communication node 100A and the radio communication node 100B, and between the radio communication node 100A and the radio communication node 100C.

In this way, the configuration in which the radio access with the UE 200 and the radio backhaul between the radio communication nodes are integrated is called Integrated Access and Backhaul (IAB).

The IAB reuses the existing function and interface that are defined for the radio access. In particular, Mobile-Termination (MT), gNB-Distributed Unit (gNB-DU), gNB-Central Unit (gNB-CU), User Plane Function (UPF), Access and Mobility Management Function (AMF), and Session Management Function (SMF), and corresponding interfaces such as NR Uu (between MT to gNB/DU), F1, NG, X2, and N4 may be used as a baseline.

The radio communication node 100A is connected to an NR radio access network (NG-RAN) and a core network (Next Generation Core (NGC) or 5GC) via a backhaul link such as a fiber transport. The NG-RAN/NGC includes a Central Unit 50 (hereinafter, CU 50) that is a communication node. Note that the NG-RAN and the NGC may be simply expressed as "network".

Note that the CU 50 may be constituted by any of the above-described UPF, AMF, and SMF or a combination thereof. Alternatively, the CU 50 may be the gNB-CU as described above.

Figure 2:
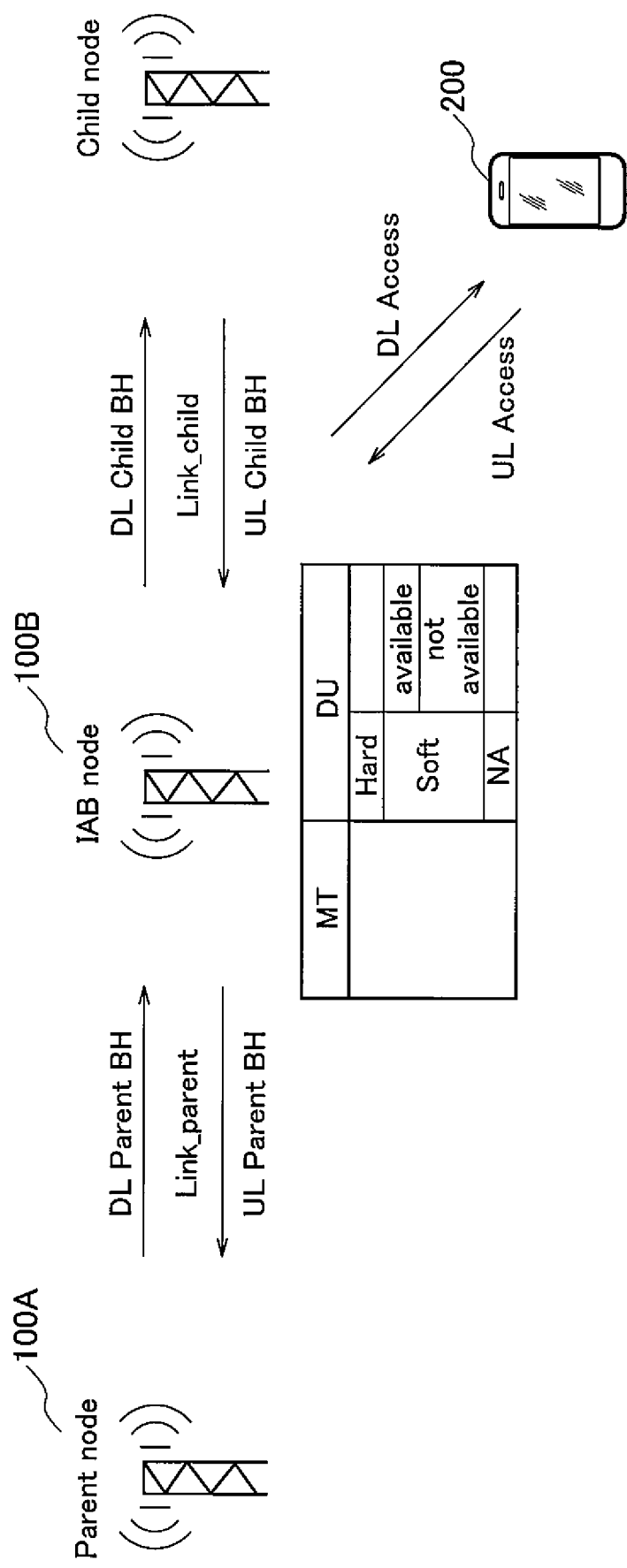
FIG. 2 is a diagram illustrating a basic configuration example of IAB.

FIG. 2 is a diagram illustrating a basic configuration example of IAB. As illustrated in FIG. 2, in the present embodiment, the radio communication node 100A constitutes a parent node in the IAB, and the radio communication node 100B (and the radio communication node 100C) constitutes an IAB node in the IAB.

Note that the parent node may be called a higher node in relation to the IAB node. In addition, the parent node may be called the IAB donor. In addition, the IAB node may be called a lower node in relation to the parent node.

A child node in the IAB is constituted by other radio communication nodes not illustrated in FIG. 1. Alternatively, the UE 200 may also constitute the child node. The IAB node may be called the higher node in relation to the child node, and the child node may be called the lower node in relation to the IAB node.

A radio link is established between the parent node and the IAB node. Specifically, the radio link called Link_parent is established.

The radio link is established between the child node and the IAB node. Specifically, the radio link called Link_child is established.

The radio link established between such radio communication nodes may be called a radio backhaul link. The Link_parent is constituted by downlink DL Parent BH and uplink UL Parent BH. The Link_child is constituted by downlink DL Child BH and uplink UL Child BH.

Note that the radio link established between the UE 200 and the IAB node or the parent node is called a radio access link. Specifically, the radio link is constituted by downlink DL Access and uplink UL Access.

The IAB node includes the Mobile Termination (MT) that is a function to connect to the parent node and the Distributed Unit (DU) that is a function to connect to the child node (or UE 200). Although omitted in FIG. 2, the parent node and the child node also have the MT and the DU.

From the viewpoint of the DU, in radio resources used by DU, downlink (DL), uplink (UL),
  and flexible time-resources (D/U/F) are classified into any type of Hard, Soft, or Not Available (H/S/NA). In addition, available or not available is defined within the Soft (S).

The flexible time-resource (F) is a time resource that is available for either DL or UL. In addition, the "Hard" is a radio resource that is always available for the DU child link in which the corresponding time resource is connected to the child node or UE, and the "Soft" is a radio resource (DU resource) in which availability for the DU child link of the corresponding time resource is explicitly or implicitly controlled by the parent node.

Furthermore, in the case of the Soft (S), a radio resource to be notified can be determined based on either IA or INA.

The "IA" means that the DU resource is explicitly or implicitly indicated as available. In addition, the "INA" means that the DU resource is explicitly or implicitly indicated as not available.

Note that a configuration example of the IAB illustrated in FIG. 2 uses CU/DU division, but the configuration of the IAB is not necessarily limited thereto. For example, in the radio backhaul, the IAB may be constituted by tunneling using GPRS tunneling protocol (GTP)-U/user datagram protocol (UDP)/Internet protocol (IP).

The main advantage of such an IAB is that NR cells can be flexibly and densely arranged without densifying a transport network. The IAB can be applied to various scenarios such as arrangement of small cells outdoors, indoors and support of a mobile relay (for example, in a bus and a train).

In addition, as illustrated in FIGS. 1 and 2, the IAB may also support deployment by NR-only standalone (SA), or deployment by non-standalone (NSA) that includes other RATS (such as LTE).

In the present embodiment, the radio access and the radio backhaul may be half-duplex communication or full-duplex communication. In addition, as a multiplexing method, time division multiplexing (TDM), space division multiplexing (SDM), and frequency division multiplexing (FDM) can be used.

When the IAB node operates in the half-duplex communication, the DL Parent BH becomes a receiving (RX) side, the UL Parent BH becomes a transmitting (TX) side, and the DL Child BH becomes a transmitting (TX) side, and the UL Child BH becomes a receiving (RX) side. In addition, in the case of the Time Division Duplex (TDD), a DL/UL configuration pattern in the IAB node is not limited only to DL-F-UL, but configuration patterns such as only radio backhaul (BH) or UL-F-DL may be applied.

In addition, in the present embodiment, SDM/FDM is used to realize a simultaneous operation of the DU and MT of the IAB node.

(2) Functional Block Configuration of Radio Communication System

Next, the functional block configuration of the radio communication node 100A and the radio communication node 100B that constitute the radio communication system 10 will be described.

(2.1) Radio Communication Node 100A

Figure 3:
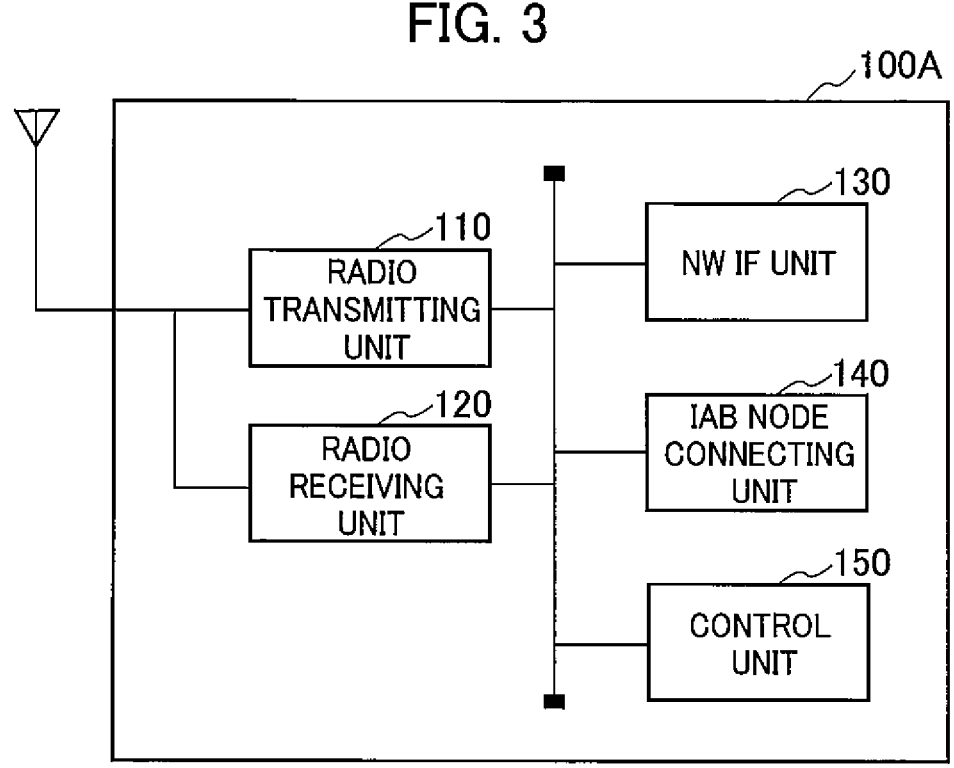
FIG. 3 is a functional block configuration diagram of a radio communication node 100A.

FIG. 3 is a functional block configuration diagram of the radio communication node 100A that constitutes the parent node. As illustrated in FIG. 3, the radio communication node 100A includes a radio transmitting unit 110, a radio receiving unit 120, an NW IF unit 130, an IAB node connection unit 140, and a control unit 150.

The radio transmitting unit 110 transmits a radio signal according to the 5G specifications. In addition, the radio receiving unit 120 receives the radio signal according to the 5G specifications. In the present embodiment, the radio transmitting unit 110 and the radio receiving unit 120 perform radio communication with the radio communication node 100B that constitutes the IAB node.

In the present embodiment, the radio communication node 100A has a function of the MT and the DU, and the radio transmitting unit 110 and the radio receiving unit 120 also transmit and receive the radio signal corresponding to the MT/DU.

The radio transmitting unit 110 and the radio receiving unit 120 can execute radio communication according to the half-duplex and the full-duplex. In addition, the radio transmitting unit 110 and the radio receiving unit 120 are not limited to the TDM (TDD), but can perform radio communication according to the FDM and the SDM.

The NW IF unit 130 provides a communication interface that realizes connection with the NGC side and the like. For example, the NW IF unit 130 may include interfaces such as X2, Xn, N2, and N3.

The IAB node connection unit 140 provides an interface or the like that realizes connection with an IAB node (or may be a child node including UE). Specifically, the IAB node connection unit 140 provides the function of the distributed unit (DU). That is, the IAB node connection unit 140 is used to connect to the IAB node (or child node).

Note that the IAB node may be expressed as a RAN node that supports the radio access with the UE 200 and backhauls access traffic by radio. In addition, the parent node, that is, an IAB donor may be expressed as the RAN node that provides a UE's interface to a core network and a radio backhaul function to the IAB node.

The control unit 150 executes control of each functional block constituting the radio communication node 100A. In particular, in the present embodiment, the control unit 150 executes control to establish the radio link with the IAB node (radio communication node 100B).

Specifically, the control unit 150 can determine the DU resource (may be referred to as a radio resource) allocated to the established radio link via the function of the DU for the IAB node.

The resource may include a time resource in a time direction and a frequency resource in a frequency direction.

The time resource is a resource in the time direction, and may have a symbol, a slot, a subframe, or the like as a unit. Further, the time direction may be called a time domain, a symbol period, a symbol time, or the like. Note that the symbol may be called an Orthogonal Frequency Division Multiplexing (OFDM) symbol.

The frequency resource is a resource in the frequency direction, and may have a resource block, a resource block group, a subcarrier, or the like as a unit. Further, the frequency direction may be referred to as frequency domain, a resource block, a resource block group, a subcarrier, a bandwidth part (BWP), and the like.

(2.2) Radio Communication Node 100B

Figure 4:
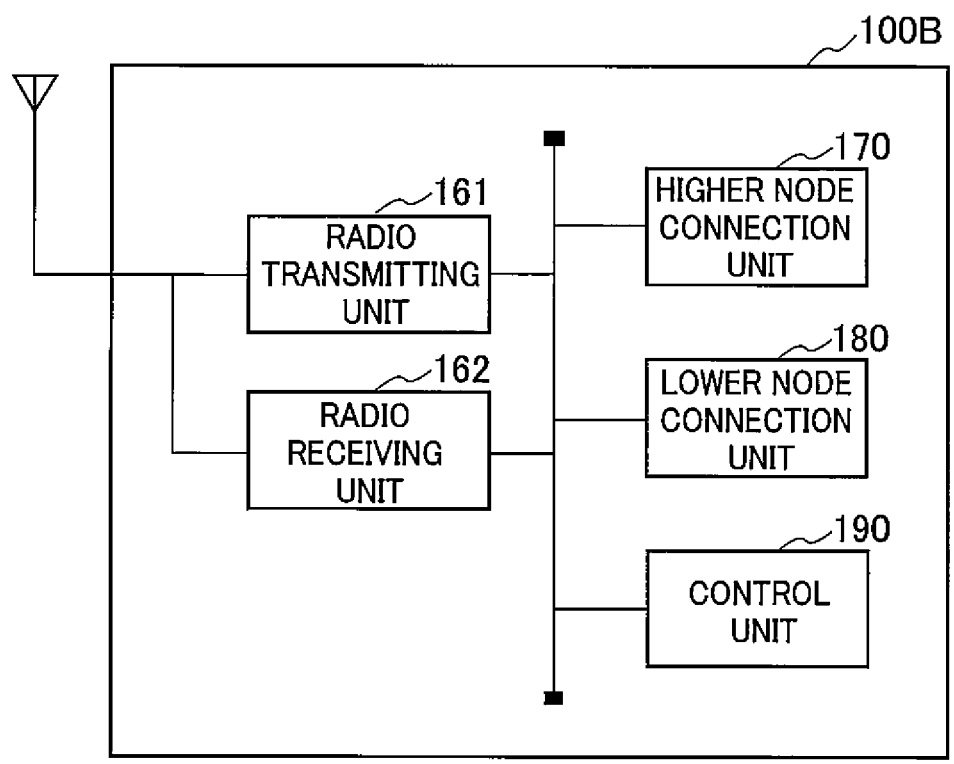
FIG. 4 is a functional block configuration diagram of a radio communication node 100B.

FIG. 4 is a functional block configuration diagram of the radio communication node 100B that constitutes the IAB node. As illustrated in FIG. 4, the radio communication node 100B includes a radio transmitting unit 161, a radio receiving unit 162, a higher node connection unit 170, a lower node connection unit 180, and a control unit 190.

As described above, the radio communication node 100B includes functional blocks similar to those of the radio communication node 100A (parent node) described above, but differs from the radio communication node 100A in that the radio communication node 100B includes the higher node connection unit 170 and the lower node connection unit 180, and differs from the radio communication node 100A in the function of the control unit 190.

The radio transmitting unit 161 transmits the radio signal according to the 5G specifications. In addition, the radio receiving unit 162 receives the radio signal according to the 5G specifications. In the present embodiment, the radio transmitting unit 161 and the radio receiving unit 162 execute the radio communication with the radio communication node 100A that constitutes the parent node and the radio communication with the child node (including the case of the UE 200).

Similar to the radio communication node 100A (parent node), the radio transmitting unit 161 and the radio receiving unit 162 can execute the radio communication according to half-duplex and full-duplex, and furthermore, execute the radio communication according to FDM and SDM without being limited to TDM (TDD).

In the present embodiment, the radio receiving unit 162 can receive, from a network, resource information indicating a type of resources allocated to a radio link with other radio communication nodes constituting a lower node, specifically, a child node in relation to the UE 200 or the IAB node. In the present embodiment, the radio receiving unit 162 constitutes a receiving unit.

Specifically, the radio receiving unit 162 can receive resource information indicating the type (H/S/NA) of DU resources allocated to the established radio link via the function of the DU for the lower node. The resource information may be transmitted from the CU 50 according to F1-application (F1-AP) protocol applied to an F1 interface between the CU and the DU, or may be transmitted from the network (specifically, gNB) by signaling of a radio resource control layer (RRC).

The resource information received by the radio receiving unit 162 can indicate the type (H/S/NA) of time resources and the type (H/S/NA) of frequency resources.

In this way, in the present embodiment, as in 3GPP Release 16, the type of DU resources may include a specific type (S) capable of designating availability of the time resource in the time direction. Furthermore, in the present embodiment, it is possible to indicate any of the H/S/NA for the frequency resource and to configure the Soft (S) that can designate IA or INA (availability).

That is, the type of resources, more specifically, DU resources, may include a specific type (S) capable of designating the availability of the frequency resource in the frequency direction.

Therefore, when the frequency resource is the specific type (S), the radio receiving unit 162 can receive the resource information indicating the availability of the frequency resource.

Further, the radio receiving unit 162 may receive the resource information indicating the availability of the time resource and the availability of the frequency resource. That is, the radio receiving unit 162 can receive the resource information indicating the distinction of the IA or INA when the time resource is the Soft (S) and the distinction of the IA or INA when the frequency resource is the Soft (S).

Specifically, the resource information can indicate the resource type (Hard, Soft, or NA) for each unit (for example, symbol) in the time direction and the resource type (Hard, Soft, or NA) for each unit (for example, subcarrier) in the frequency direction.

Note that the unit (may be referred to as a time unit) in the time direction is not limited to the symbol as described above, and may be a slot or the like composed of a plurality of symbols (for example, 14 symbols).

Also, the resource information may indicate a frequency resource based on a resource block (RB) or a resource block group (RBG). One RB may be interpreted as 12 resource elements (REs) in the frequency domain, and one RE may be interpreted as a minimum unit of a resource grid composed of one subcarrier (one OFDM symbol in the time domain) in the frequency domain.

Further, the radio receiving unit 162 can receive the resource information indicating the availability of the frequency resources for each unit in the time direction. For example, the radio receiving unit 162 can receive resource information indicating the distinction of the IA or INA when the frequency resource is the Soft (S) for each symbol (may be a slot or the like) which is a unit in the time direction.

Further, when the time resource in the time direction is Soft (specific type), the radio receiving unit 162 can receive the resource information indicating the availability of the frequency resource only in the unit in the time direction corresponding to the time resource.

Specifically, when the time resource is the Soft, the radio receiving unit 162 targets only the unit (for example, symbol) in the time direction of the time resource, and may receive the resource information indicating the IA or INA when the frequency resource is the Soft (S).

The higher node connection unit 170 provides an interface that realizes connection with a node higher than the IAB node. The higher node means a radio communication node located on the network side, more specifically on the core network side (may be called an upstream side or an upper side), than the IAB node.

Specifically, the higher node connection unit 170 provides the function of the Mobile Termination (MT). That is, the higher node connection unit 170 is used to connect to the parent node that constitutes the higher node in the present embodiment.

The lower node connection unit 180 provides an interface or the like that realizes connection with a node lower than the IAB node. Note that the lower node means the radio communication node located on an end user side (may be called a downstream side or a lower side) of the IAB node.

Specifically, the lower node connection unit 180 provides the function of the distributed unit (DU). That is, the lower node connection unit 180 is used to connect to the child node (may be the UE 200) that constitutes the lower node in the present embodiment.

The control unit 190 executes control of each functional block constituting the radio communication node 100B. In particular, in the present embodiment, the control unit 190 establishes the radio link based on the resource information received from the network (may include the CU 50).

Specifically, the control unit 190 may determine, based on the type (H/S/NA) of time resources indicated by the resource information and the type (H/S/NA) of frequency resources, resources (DU resources) allocated to the radio link with other radio communication nodes constituting the lower node, specifically, the child node in relation to the UE 200 or the IAB node.

Various channels may be transmitted and received via the radio link to which the DU resource is allocated.

The channel includes a control channel and a data channel. The control channel includes a Physical Downlink Control Channel (PDCCH), a Physical Uplink Control Channel (PUCCH), a Physical Random Access Channel (PRACH), a Physical Broadcast Channel (PBCH), and the like.

In addition, the data channel includes a Physical Downlink Shared Channel (PDSCH), a Physical Uplink Shared Channel (PUSCH), and the like.

Note that a reference signal includes a Demodulation Reference Signal (DMRS), a Sounding Reference Signal (SRS), a Phase Tracking Reference Signal (PTRS), and a Channel State Information-Reference Signal (CSI-RS), and a signal includes the channels and the reference signal. Further, the data may mean data transmitted via the data channel.

Uplink Control Information (UCI) is UL control information and is control information symmetrical to Downlink Control Information (DCI). The UCI is transmitted via the PUCCH or the PUSCH. The UCI may include Scheduling Request (SR), Hybrid Automatic Repeat Request (HARQ) ACK/NACK, Channel Quality Indicator (CQI), and the like.

The DCI is DL control information. The DCI is transmitted via the PDCCH. The DCI may include schedule information and the like of the PDSCH and the PUSCH.

In the present embodiment, the control unit 190 may repeatedly apply the availability of frequency resources (IA or INA) in the time direction. For example, the control unit 190 may repeatedly apply the fact that the frequency resource is IA to the frequency resources of the plurality of symbols (may be slots and the like) in the time direction when it is notified only once that the frequency resource is the IA. Note that the symbol, that is, the unit in the time direction may be continuous or discontinuous.

Further, when the frequency resource of the soft (specific type) is not allocated to the radio link (Link_parent) with the higher node (radio communication node 100A), the control unit 190 may allocate the frequency resource to the radio link (Link_child or DL Access/UL Access) with the lower node (child node or UE 200).

That is, when the frequency resource is not allocated to the MT (may be referred to as MT serving cell), the control unit 190 can allocate the frequency resource to the DU (may be referred to as DU serving cell).

(3) Operation of Radio Communication System

Next, the operation of the radio communication system 10 will be described. Specifically, the operation related to the simultaneous transmission and reception of the IAB node (radio communication node 100B) using the FDM between the radio link (parent link (Link_parent)) with a parent node (radio communication node 100A) and the radio link (child link (Link_child)) with the child node (other radio communication nodes that constitute the UE 200 or the child node) will be described.

(3.1) Assumption

In 3GPP Release 16, resource multiplexing by the TDM is defined between the parent link and the child link.

Specifically, the DU resource for the TDM can be configured semi-statically. In each serving cell formed by the IAB node DU, the IAB node DU can configure the resource type of Hard, Soft, or NA for the symbols in each slot.

The configuration can be realized using a GNB-DU resource configuration which is an F1-AP message transmitted from CU 50.

In addition, when the DU resource (symbol) is Soft, dynamic indication (IA or INA) can be made explicitly and implicitly.

Specifically, when the symbols of the DL, UL, or Flexible are configured as the Soft, the IAB node DU can perform any of transmission/reception, transmission, or reception within the symbol only in the following cases.

IAB node MT does not perform the transmission or reception in the symbol (implicit indication)

Since the IAB node MT performs transmission or reception in the symbol, the IAB node DU does not change the transmission or reception in the symbol by using the symbol (implicit indication)

The IAB node MT detects DCI format 2_5 (3GPP TS38.212 Section 7.3) and indicates that the symbol is available by a field value of an Availability Indicator (AI) index (explicit indication).

In addition, regarding the DU resource in the frequency domain, the CU 50 can use information element (IE) of the Served Cell Information to configure frequency information and a transmission bandwidth of a serving cell formed by the DU (hereinafter, DU serving cell) via F1-AP signaling. The Served Cell Information can include IE of NR Frequency Info and Transmission Bandwidth.

In 3GPP Release 17, extension of the radio resource multiplexing is planned to support the simultaneous transmission and reception on the parent link and the child link.

For example, the extension of the simultaneous transmission and reception in the following combination of the transmission and reception directions is planned.

MT transmission/DU transmission
MT transmission/DU reception
MT reception/DU transmission
MT reception/DU reception In addition, support for dual connectivity (DC) that allows simultaneous communication between the UE and each of the two NG-RAN Nodes is also planned. Furthermore, in order to support the simultaneous transmission and reception, a timing mode of the IAB node, DL/UL power control, Cross Link Interference (CLI) in the radio backhaul (BH) links, and interference measurement extension can be considered.

Based on such 3GPP stipulations and examinations, semi-static or dynamic resource multiplexing between the parent link and the child link by the FDM can be considered.

In the case of the semi-static resource configuration between the parent link and the child link by the FDM, the following preconditions exist.

(Assumption 1): Hard, Soft, or NA is configured for each frequency resource for each DU serving cell (time resource is indicated according to the DCI format 2_5 of the 3GPP Release 16).

(Assumption 2): For each DU serving cell, the Hard, Soft, or NA is configured for each combination of the time resource and frequency resource (T-F resources).

Further, when the frequency resource or the T-F resource is configured to be Soft (S), the availability (IA or INA) of the resource may be dynamically configured. In this case, the availability may be explicitly indicated or implicitly indicated.

In the following, the operation related to the dynamic indication of the availability of the resource will be described.

(3.2) Operation Overview

An operation example described below includes operation examples 0 to 4.

(Operation Example 0): Existing DCI format 2_5 is used. Operation Example 0 corresponds to the above-described Assumption 1 and Assumption 2.

(Operation Example 1): A new DCI format is defined, and the availability (IA or INA) of the frequency resource is notified (may be used together with DCI format 2_5). Assumption 1, that is, it corresponds to the case where the semi-static configuration is separately established in the time direction and the frequency direction, respectively.

(Option 1): The availability (IA or INA) in the frequency direction is notified only once, and the configuration of the availability based on the notification is repeatedly applied for the frequency resource in the plurality of symbols (may be slots and the like) in the time direction.

(Operation Example 1-1): Notification is made using a bitmap indicating the availability in the frequency direction.

(Option 2): The availability in the frequency direction is notified for each time unit (for example, symbol, slot, and the like).

(Operation Example 1-2): Notification is made using a bitmap indicating the availability for the combination of the frequency direction and the time direction.

(Option 2-1): Bits in frequency direction (y)×time direction (x) are used (frequency direction is displayed first, and time direction is displayed later).

(Option 2-2): Bits in time direction (x)×frequency direction (y) are used (time direction is displayed first, and frequency direction is displayed later).

(Operation Example 1-2a): The availability of only the Soft (S) symbol in the time direction is notified.

(Operation Example 2): A new DCI format is defined, and the availability (IA or INA) of the time resource and the frequency resource is notified (the DCI format 2_5 is not necessary). Assumption 2, that is, it corresponds to the case where the semi-static configuration is simultaneously established in the time direction and the frequency direction, respectively.

(Option 1): Bitmaps in frequency direction (y)×time direction (x) are used (frequency direction is displayed first, and time direction is displayed later).

(Option 2): Bitmaps in time direction (x)×frequency direction (y) are used (time direction is displayed first, and frequency direction is displayed later).

(Operation Example 2a): The availability of only the Soft (S) symbol in the time direction is notified.

(Operation example 3): Implicit indication

When the frequency resource of the soft (S) is not allocated to the MT (MT serving cell), the IAB node allocates the frequency resource to the DU (DU serving cell).

(Operation Example 4): Configuration of resource block group (RBG)

The granularity of the notification (instruction) in the frequency direction, specifically, the size of the RBG is defined in advance by the 3GPP specifications, or is configured by signaling such as the RRC.

(3.3) Operation Example

Figure 5:
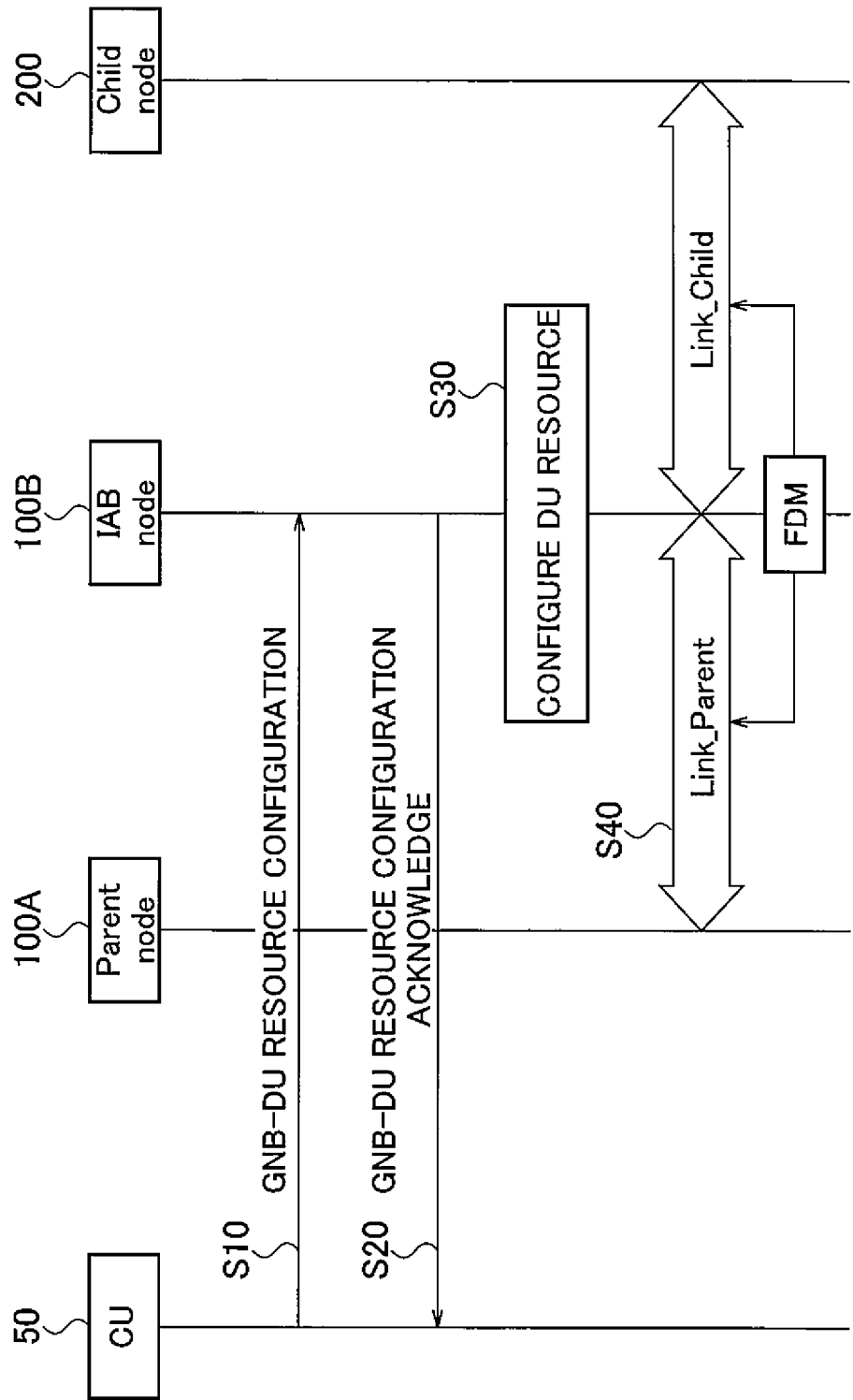
FIG. 5 is a diagram illustrating a schematic communication sequence for configuring a DU resource of the IAB node.

First, the overall sequence for configuring the DU resource of the IAB node will be described. FIG. 5 illustrates a schematic communication sequence for configuring the DU resource of the IAB node.

As illustrated in FIG. 5, the CU 50 transmits a GNB-DU RESOURCE CONFIGURATION including the type (type) of DU resources of the IAB node to the radio communication node 100B (IAB node) (S10).

The GNB-DU RESOURCE CONFIGURATION is a type of F1-AP message and is defined in the 3GPP TS38.473.

The radio communication node 100B, specifically, the DU of the IAB node returns the GNB-DU RESOURCE CONFIGURATION ACKNOWLEDGE to the CU 50 in response to receiving the GNB-DU RESOURCE CONFIGURATION (S20). Note that the GNB-DU RESOURCE CONFIGURATION and the GNB-DU RESOURCE CONFIGURATION ACKNOWLEDGE are a type of F1-AP messages and are defined in the 3GPP TS38.473.

The radio communication node 100B configures the DU resource based on the type (H/S/NA) of DU resources included in the GNB-DU RESOURCE CONFIGURATION (S30).

Specifically, the radio communication node 100B determines the time resource and the frequency resource allocated to the child link (Link_child) based on the type (H/S/NA) of DU resources. Note that the child link may be called a DU serving cell as described above.

The radio communication node 100A (parent node) and the radio communication node 100B establishes the parent link (Link_parent) and the child link (Link_child) (S40). As described above, in this operation example, the transmission/reception according to the FDM, that is, the FDD is executed between the parent link and the child link.

(3.3.1) Operation Example 0

In this operation example, the DCI format 2_5 defined in 3GPP Release 16 is reused. Specifically, when the DCI format 2_5 indicates a symbol that can be used as the DU resource, the frequency resources (hereinafter referred to as soft frequency resources) or the T-F resources (hereinafter referred to as soft T-F resources) configured to be the Soft (S) within all the symbols may be used for the DU of the IAB node.

In addition, for example, when the symbol can be implicitly determined to be available for the DU as in 3GPP Release 16 such as when the MT of the IAB node does not execute the transmission/reception (Tx/Rx) within a symbol, the soft frequency resources or the soft T-F resources within all the symbols may be used for the DU of the IAB node.

(3.3.2) Operation Example 1

In this operation example, the availability of the soft frequency resource (IA or INA, hereinafter abbreviated as IA/INA as appropriate) is explicitly indicated by the DCI of a new format (referred to as DCI format X for convenience).

The IAB node may configure the identification information of the IAB node, specifically, the Radio Network Temporary Identifier (RNTI), in order to monitor the DCI format X.

The DCI format X can indicate the IA/INA of the soft frequency resources for the plurality of DU serving cells. Specifically, for each DU serving cell, the field of the frequency availability indicator included in the DCI format X may indicate the IA/INA of the soft frequency resource. The IAB node may determine the IA/INA of the soft frequency resource for each DU serving cell based on the position of the frequency availability indicator included in the DCI format X. In addition, the IAB node may be configured based on the payload of the DCI format X.

Figure 6A:
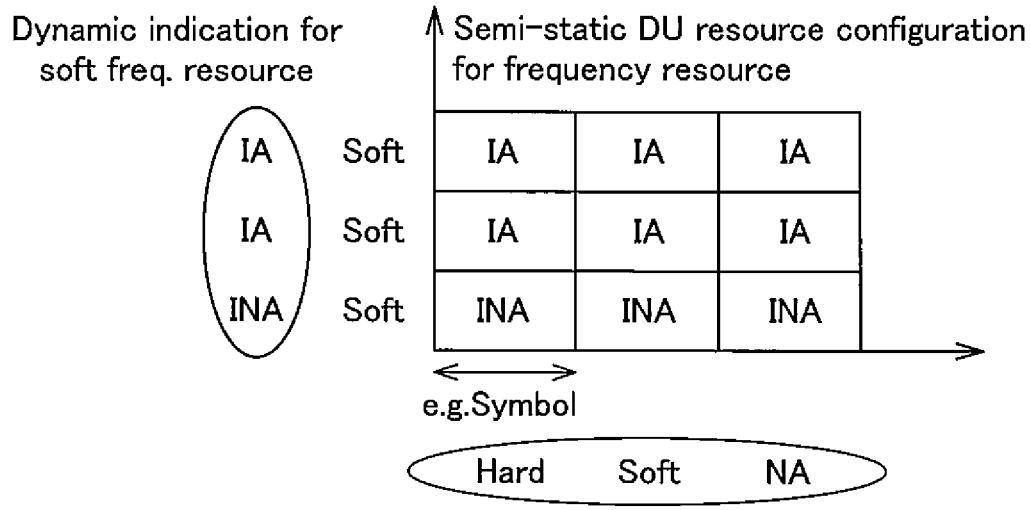
FIG. 6A is a diagram illustrating a configuration example of a DU resource according to option 1 of operation example 1.
Figure 6B:
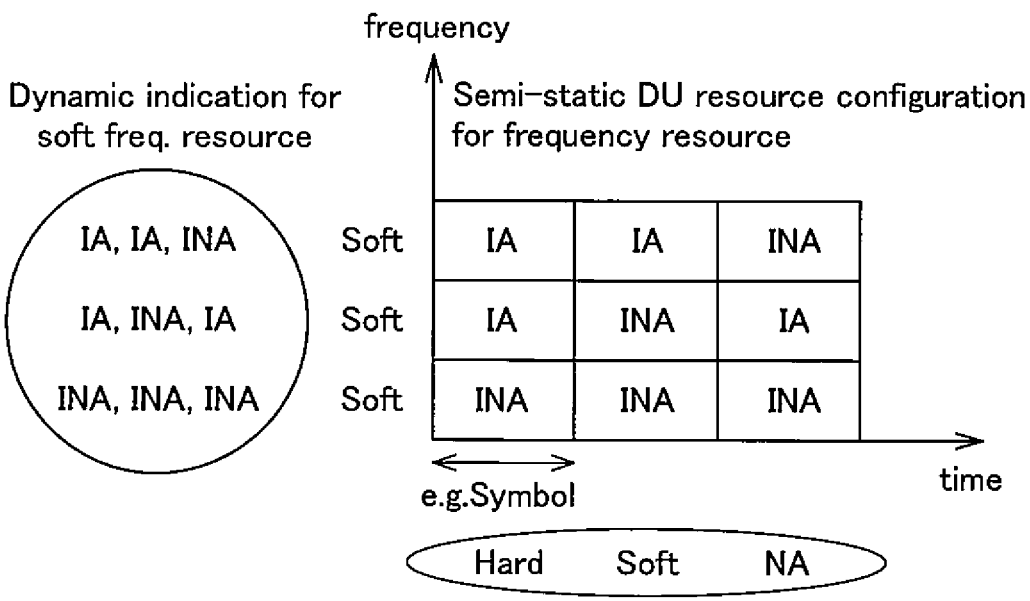
FIG. 6B is a diagram illustrating a configuration example of a DU resource according to option 2 of the operation example 1.

For example, the frequency availability indicator may have the following configuration.

frequency availability indicator 1, frequency availability indicator 2, . . . , frequency availability indicator N Further, as described above, in this operation example, two options may be provided. FIG. 6A is a diagram illustrating a configuration example of the DU resource according to the option 1 of the operation example 1. In addition, FIG. 6B is a diagram illustrating a configuration example of the DU resource according to the option 2 of the operation example 1.

In the case of option 1, the frequency availability indicator of the DCI format X indicates whether the soft frequency resource is the IA or the INA, and the IA/INA may be applied to all applicable slots/symbols.

In FIG. 6A, the IA/INA of three soft frequency resources are IA, IA, and INA from the top, and the IA/INA of the soft frequency resources (RB, RBG, and the like) may be applied to all time resources in the time direction, specifically, symbols (Hard, Soft, NA from the left).

In the case of option 2, the frequency availability indicator of the DCI format X indicates whether the soft frequency resource is the IA or the INA, and the IA/INA may be applied in the time unit (for example, slot, symbol, symbol group, or type of D/U/F of each slot).

In FIG. 6B, the IA/INA of three soft frequency resources may be indicated for each time unit (here, three time units), and may be indicated by a total of nine frequency availability indicators (IA, IA, INA, IA, INA, IA, INA, INA, and INA).

Note that here, the "IA" may mean that the soft frequency resource is available in the time unit and is available by the DU, that is, is available as the DU resource. Note that such an indication by the IA does not mean that the DU of the IAB node can use the T-F resource (combination of the time resource and the frequency resource), but the DU of the IAB node can use the T-F resource only when the time resource is configured as being available/or is indicated.

In addition, note that here, the "INA" may mean that the soft frequency resource is not available in the time unit and is not available by the DU, that is, is not available as the DU resource. Alternatively, the INA may mean that there is no specific indication for the soft frequency resource.

(3.3.2.1) Operation Example 1-1

In option 1 (notify IA/INA only once), the IA/INA may be indicated using a bitmap. In the option 1, each bit that constitutes the bitmap may indicate the availability of each soft frequency resource.

For example, when the bit is configured to "1" (or "0"), it may mean IA, and when the bit is configured to "0" (or "1"), it may mean INA.

The granularity (unit) of the soft frequency resource may be the resource block (RB) or the resource block group (RBG) as described above. Note that the granularity of the soft frequency resource may be the same as or different from the configuration of the semi-static H/S/NA.

In addition, the time (applicable time duration) to which the IA/INA indication by the DCI is applied may be defined in advance by the 3GPP specifications, or may be configured by signaling such as the RRC.

Figure 7:
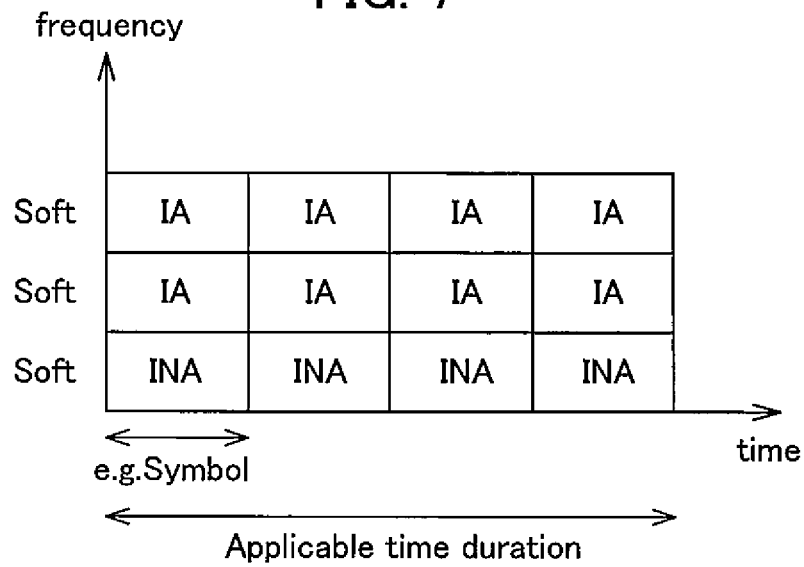
FIG. 7 is a diagram illustrating a configuration example of a DU resource according to operation example 1-1.

FIG. 7 is a diagram illustrating a configuration example of the DU resource according to the operation example 1-1. As illustrated in FIG. 7, the frequency availability indicator (bitmap) is indicated as "0 1 1" and corresponds to "INA, IA, IA" of the soft frequency resources. Note that "1" means "IA" (the same applies below).

In this operation example, the IAB node needs both the DCI format 2_5 (for time resource) and the DCI format X (for frequency resource) in order to determine whether the T-F resource can be used in the DU. The T-F resource may be determined to be available when it is indicated that the T-F resource is available in both the DCI format 2_5 and the DCI format X.

(3.3.2.2) Operation Example 1-2

In option 2 (notification of availability in frequency direction for each time unit), the option 2-1 and the option 2-2 may be further applied as described above.

In the option 2-1, the frequency availability indicator may include x bit groups. Each group may be composed of y bits.

Each group may indicate the availability of y soft frequency resources in the time unit. Each bit that constitutes a group may indicate the availability of each soft frequency resource. The first y bit may indicate the availability of the soft frequency resource in the first time unit, and the next bit may sequentially indicate the availability of the soft frequency resource in the next time unit.

Also in the option 2-2, the frequency availability indicator may include x bit groups, and each group may be composed of y bits.

Each group may indicate the availability of each of the y soft frequency resources in the time unit. Each bit that constitutes the group may indicate the availability of each soft frequency resource in the time unit. The first y bit may indicate the availability of the y soft frequency resource in the first time unit, and the next y bit may sequentially indicate the availability of the y soft frequency resource in the next time unit.

Figure 8:
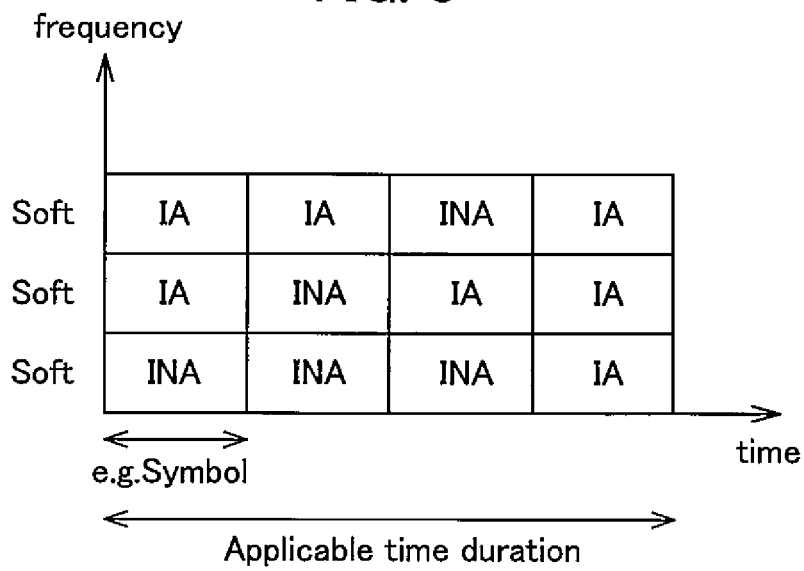
FIG. 8 is a diagram illustrating a configuration example of a DU resource according to operation example 1-2.

FIG. 8 is a diagram illustrating a configuration example of a DU resource according to operation example 1-2. As illustrated in FIG. 8, in the case of the option 2-1, the frequency availability indicator is indicated as "011 001 010 111", and corresponds to "INA, IA, IA, INA, INA, IA, INA, IA, INA, IA, IA, IA" of the soft frequency resource.

In addition, in the case of the option 2-2, the frequency availability indicator is indicated as "0001 1011 1101", and corresponds to "INA, INA, INA, IA, IA, INA, IA, IA, IA, IA, INA, IA" of the soft frequency resource.

Note that as described above, the time unit may be subframes of each slot/multi-slot/slot/symbol/symbol group/type of D/U/F resources (time resources) semi-statically configured in advance (the same applies below). The time (applicable time duration) to which the granularity and the indication of IA/INA in the time unit are applied may be defined in advance by the 3GPP specifications, or may be configured by signaling such as the RRC. The soft frequency resource may use the RB or the RBG as a unit.

Even in this operation example, the IAB node needs both the DCI format 2_5 (for time resource) and the DCI format X (for frequency resource) in order to determine whether the T-F resource can be used in the DU. The T-F resource may be determined to be available when it is indicated that the T-F resource is available in both the DCI format 2_5 and the DCI format X.

Figure 9:
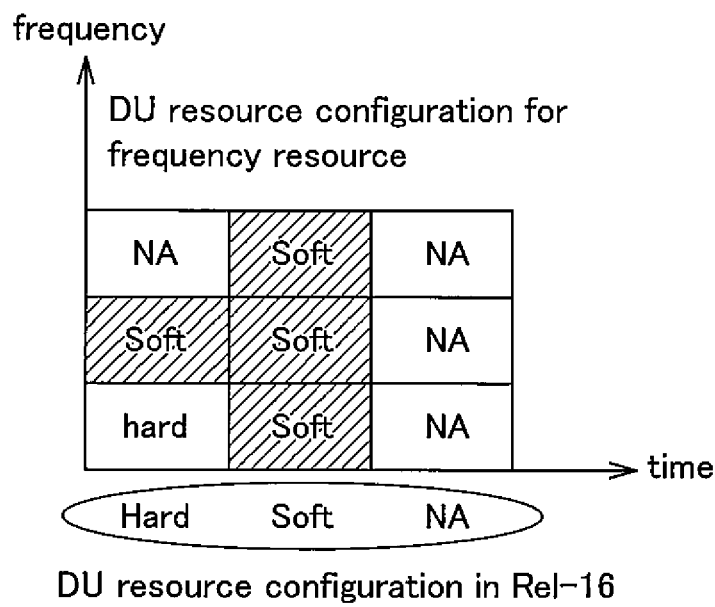
FIG. 9 is a diagram illustrating a configuration example (modification) of the DU resource according to the operation example 1-2.

In addition, this operation example may be changed as follows. FIG. 9 is a diagram illustrating a configuration example (modification) of the DU resource according to the operation example 1-2. As illustrated in FIG. 9, the frequency availability indicator (bitmap) may be configured only for the DU resources configured to be the Soft (S), specifically, the frequency resources.

In the example illustrated in FIG. 9, in the case of the option 2-1, four frequency resources (see the shaded area in the figure) configured to be the Soft (S) are targeted, and the frequency availability indicator is indicated as "0 110", and corresponds to "INA, IA, IA, INA" of the soft frequency resource.

In addition, in the case of the option 2-2, four frequency resources configured to be the Soft (S) are targeted, and the frequency availability indicator is indicated as "1 01 0", and corresponds to "IA, INA, IA, INA" of the soft frequency resource.

(3.3.2.2a) Operation Example 1-2a

This operation example corresponds to the modification of the operation example 1-2, that is, corresponds to the modification of the option 2 (notification of availability in the frequency direction for each time unit) (for convenience, referred to as option 2a).

Even in this operation example, the frequency availability indicator by the DCI format X may indicate the availability of the soft frequency resources in each time unit (similar to option 2).

The IAB node (and UE 200) may determine whether the T-F resource is the Soft based on the configuration of the semi-static DU resource.

Figure 10:
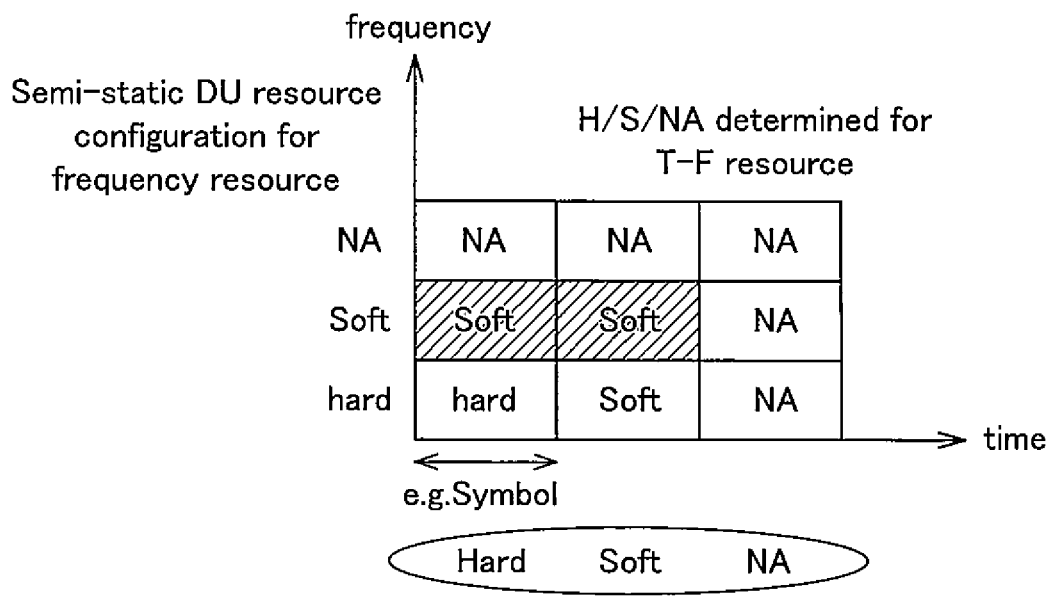

FIG. 10 is a diagram illustrating a configuration example of the DU resource according to the operation example 1-2a. As illustrated in FIG. 10, the frequency availability indicator may indicate only the availability of the T-F resource determined to be the Soft. That is, the frequency availability indicator may only indicate the availability of the soft frequency resource configured to be the Hard or Soft, and may not indicate the availability of the soft frequency resource configured to be the NA.

In the example illustrated in FIG. 10, two T-F resources are determined to be Soft, and the frequency availability indicator may indicate the availability of the soft frequency resource (IA and INA in the example of FIG. 10).

Note that the option 2a can also be applied to the operation example 1-2 described above. In addition, even in this operation example, the IAB node needs both the DCI format 2_5 (for time resource) and the DCI format X (for frequency resource) in order to determine whether the T-F resource can be used in the DU. The T-F resource may be determined to be available when it is indicated that the T-F resource is available in both the DCI format 2_5 and the DCI format X.

Furthermore, in the operation example 1-2 and the operation example 1-2a, a payload size of the DCI (DCI format X) may depend on the number of frequency resources in the time unit, but the number of frequency resources in each time unit may be different.

In order to keep the payload size of the DCI constant, it is preferable that the patterns of the frequency resources of the H/S/NA are periodic. This enables the DCI to periodically indicate the availability of the frequency resources. The payload size of the DCI for the DU serving cell may depend on the number of soft frequency resources included in the periodicity.

Figure 11:
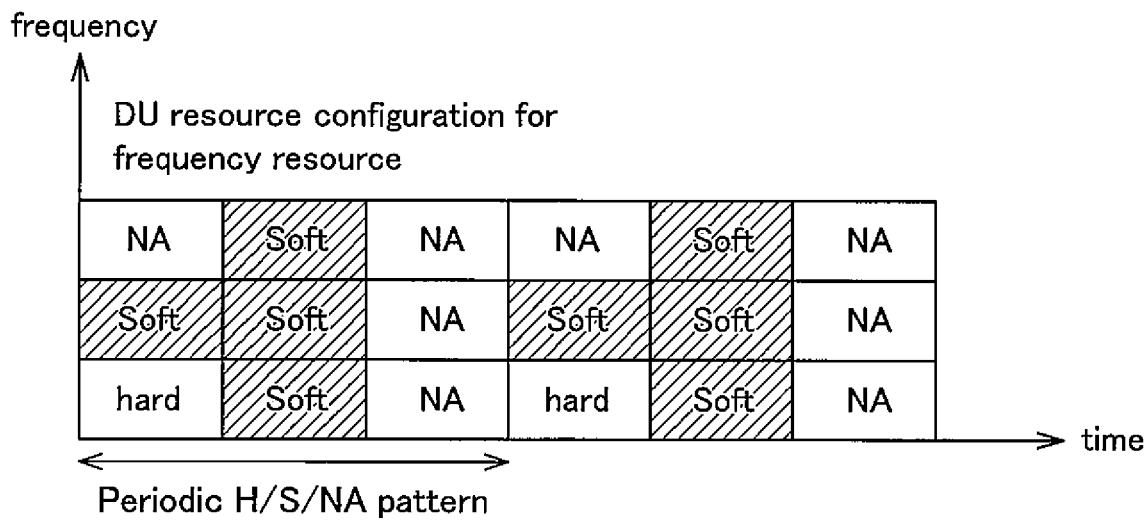

FIG. 11 is a diagram illustrating a configuration example of a periodic DU resource according to the operation example 1-2 and the operation 1-2a. In the example illustrated in FIG. 11, the DCI can indicate the availability of four soft frequency resources (see the shaded area in the figure) within specific periodicity (Periodic H/S/NA pattern in the figure). In this case, the payload size of the DCI can be fixed as 4 bits.

(3.3.3) Operation Example 2

As in the operation example 1, in this operation example, the availability of the soft T-F resource is explicitly indicated by the DCI (DCI format X).

In addition, in this example, the IAB node may configure the identification information of the IAB node, specifically, RNTI, in order to monitor the DCI format X.

The DCI format X can indicate the IA/INA of the soft T-F resources for the plurality of DU serving cells. Specifically, for each DU serving cell, the field of the T-F availability indicator included in the DCI format X may indicate the IA/INA of the soft T-F resource. The IAB node may determine the IA/INA of the soft T-F resource for each DU serving cell based on the position of the T-F availability indicator included in the DCI format X. In addition, the IAB node may be configured based on the payload of the DCI format X.

For example, the T-F availability indicator may have the following configuration.

T-F availability indicator 1, T-F availability indicator 2, . . . , T-F availability indicator N In this operation example, the IAB node needs only the DCI format X and does not need the DCI format 2_5 to determine whether the T-F resource can be used in the DU.

Figure 12A:
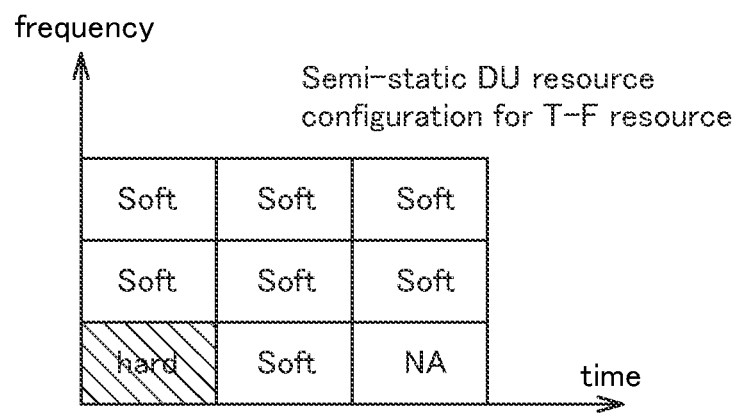
FIG. 12A is a diagram illustrating a configuration example (configuration example 1) of a DU resource according to operation example 2.
Figure 12B:
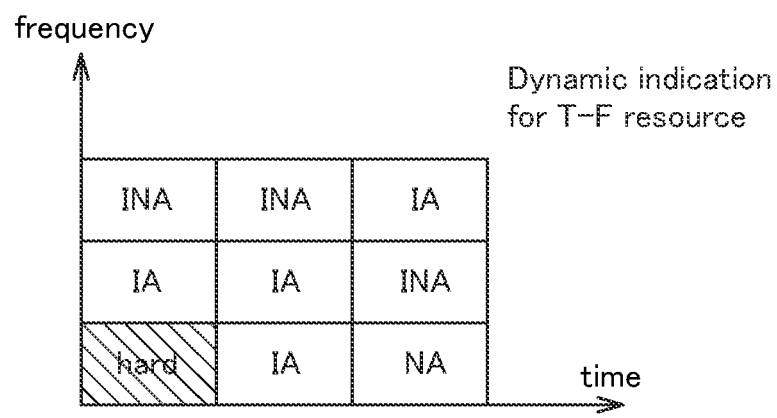
FIG. 12B is a diagram illustrating a configuration example (configuration example 2) of the DU resource according to the operation example 2.

FIGS. 12A and 12B are diagrams illustrating a configuration example (configuration examples 1 and 2) of the DU resource according to the operation example 2. Specifically, FIG. 12A illustrates a configuration example of the semi-static DU resource for the T-F resource. Further, FIG. 12B illustrates an example of dynamic indication of the T-F resource.

As illustrated in FIGS. 12A and 12B, the IA/INA of the DU resource (may be interpreted as the soft T-F resource) may be indicated for the DU resource that is configured to be the Soft by configuring the semi-static DU resource for the T-F resource.

Note that here, the "IA" may mean that the soft T-F resource is available and is available by the DU, that is, is available as the DU resource.

In addition, note that here, the "INA" may mean that the soft T-F resource is not available and is not available by the DU, that is, is not available as the DU resource. Alternatively, the INA may mean that there is no specific indication for the soft T-F resource.

In this operation example, it is possible to use a bitmap indicating the availability of the soft T-F resources for each DU serving cell. Each bit of the bitmap may indicate availability of a specific soft T-F resource.

Similar to the operation example 1, the granularity (unit) of the soft T-F resource may be the resource block (RB), the resource block group (RBG), or the like. In addition, the granularity in the time direction may be subframe of each slot/multi-slot/slot/symbol/symbol group/type of D/U/F resources, and the like. Further, the granularity may be defined in advance by the 3GPP specifications, or may be based on (similar to) the configuration of the semi-static H/S/NA.

In addition, similar to the operation example 1, when the bit is configured to "1" (or "0"), it may mean IA, and when the bit is configured to "0" (or "1"), it may mean INA.

The time (applicable time duration) when the IA/INA instruction by the DCI is applied may be defined in advance by the 3GPP specifications, or may be based on (similar to) the periodicity of the semi-static H/S/NA.

In addition, as described above, in this example, the option 1 or the option 2 may be applied. Specifically, in the option 1, a bitmap indicating the availability of the DU resources in the frequency direction (y) first and then the time direction (x) is used. In the option 2, a bitmap indicating the availability of the DU resources in the time direction (x) first and then the frequency direction (y) is used.

Figure 13A:
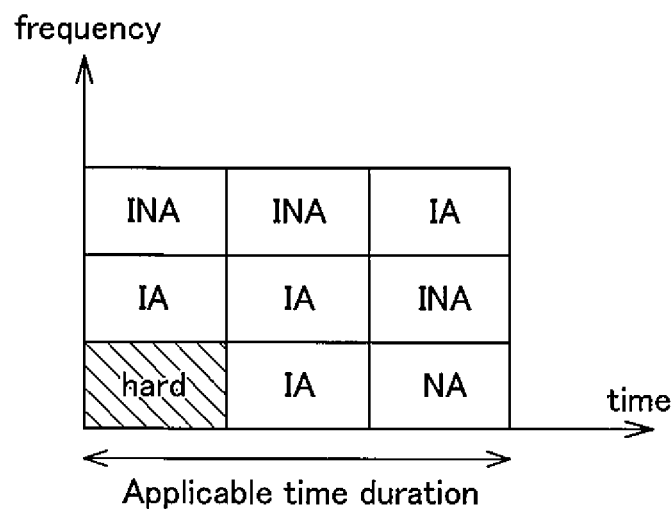
FIG. 13A is a diagram illustrating a configuration example (configuration example 1) of the DU resource according to the option 1 and the option 2 of the operation example 2.
Figure 13B:
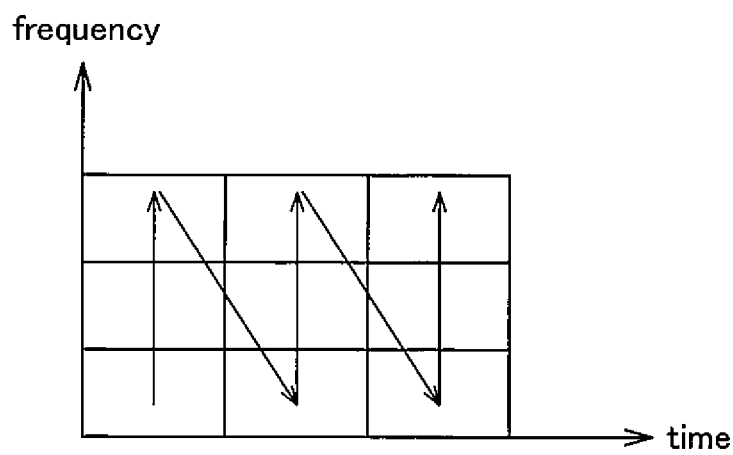
FIG. 13B is a diagram illustrating a configuration example (configuration example 2) of the DU resource according to the option 1 and the option 2 of the operation example 2.
Figure 13C:
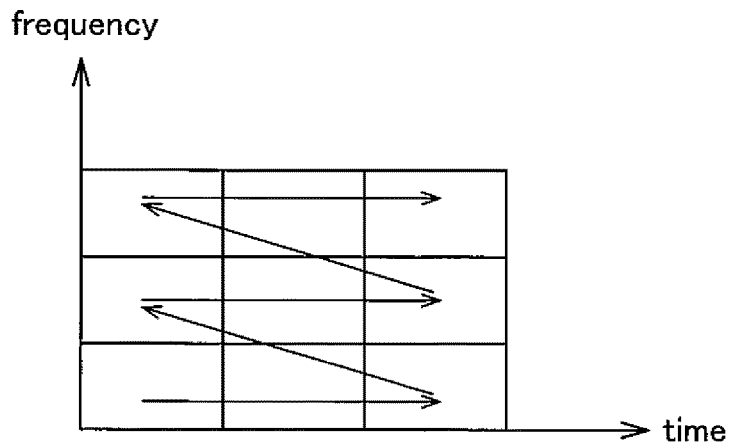
FIG. 13C is a diagram illustrating a configuration example (configuration example 3) of the DU resource according to the option 1 and the option 2 of the operation example 2.

FIGS. 13A to 13C are diagrams illustrating a configuration example (configuration examples 1 to 3) of the DU resource according to the option 1 and the option 2 of the operation example 2.

FIG. 13A is an example of a dynamic indication of the T-F resource, and is similar to the example in FIG. 12B. In the example of FIG. 13A, three time resources (symbol, and the like) are configured as the time (applicable time duration) when the indication of the IA/INA by the DCI is applied.

FIG. 13B illustrates a configuration example of the soft T-F resource according to the option 1. As described above, in the option 1, a bitmap indicating the availability of the DU resources in the frequency direction (y) first and then the time direction (x) is indicated (see the arrow in the figure). As illustrated in FIG. 13B, the T-F availability indicator (bitmap) is indicated as "10 110 01" and corresponds to "IA, INA, IA, IA, INA, INA, IA" of the soft T-F resource.

FIG. 13C illustrates a configuration example of the soft T-F resource according to the option 2. As described above, in the option 1, a bitmap indicating the availability of the DU resources in the time direction (x) first and then the frequency direction (y) is indicated (see the arrow in the figure). As illustrated in FIG. 13C, the T-F availability indicator (bitmap) is indicated as "1 110 001" and corresponds to "IA, IA, IA, INA, INA, INA, IA" of the soft T-F resource.

(3.3.3a) Operation Example 2a

This operation example may be interpreted as a modification of the operation example 2. Note that the operation example 2 can be applied to the above-described (assumption 1), that is, when the Hard, Soft, or NA is configured for each frequency resource for each DU serving cell.

The IAB node (and UE 200) may determine whether the T-F resource is the Soft based on the configuration of the semi-static DU resource of the 3GPP Release 16.

Figure 14:
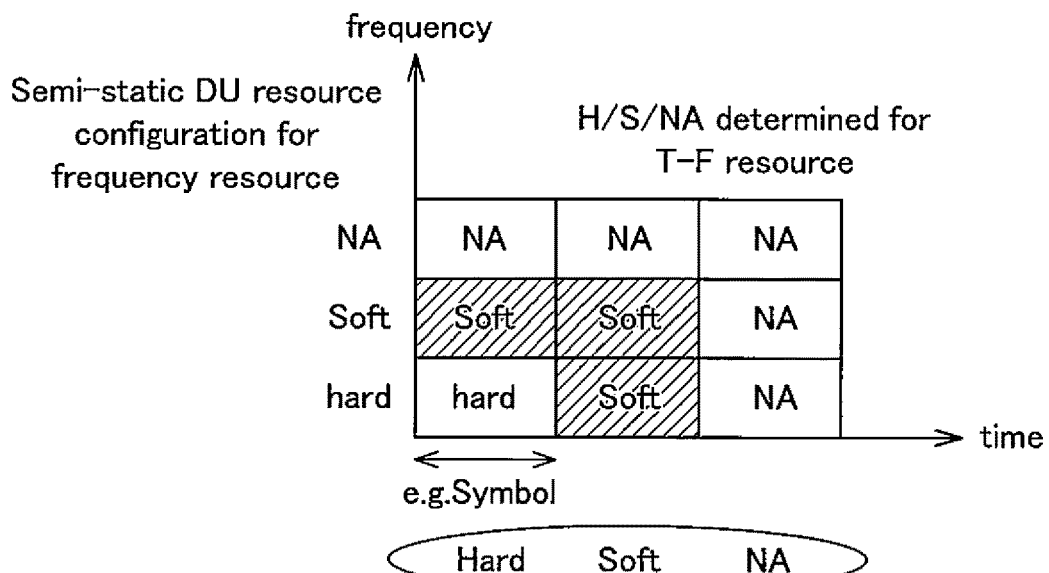

FIG. 14 illustrates a configuration example of the DU resource according to the operation example 2a. As illustrated in FIG. 14, the T-F availability indicator according to the DCI format X may indicate only the availability (IA/INA) of the T-F resource (see the shaded area in the figure) determined to be the Soft.

Similar to the operation example 2, in this operation example 2a, the IAB node needs only the DCI format X and does not need the DCI format 2_5 to determine whether the T-F resource can be used in the DU.

(3.3.4) Operation Example 3

In this operation example, when the frequency resource of the soft (S) is not allocated to the MT (MT serving cell), the IAB node can allocate the frequency resource to the DU (DU serving cell). That is, the IAB node may implicitly determine the frequency resource that is available for the DU according to the configuration of the soft frequency resource of the MT.

Specifically, the IAB node may use the frequency resource to perform the transmission and/or reception at the DU when the soft frequency resource is not used for transmission and/or reception in the MT.

Similarly, when the T-F resource of the soft (S) is not allocated to the MT (MT serving cell), the IAB node can allocate the T-F resource to the DU (DU serving cell). That is, the IAB node may implicitly determine the soft T-F resource that is available for the DU according to the configuration of the soft T-F resource of the MT.

Specifically, the IAB node may use the T-F resource to perform the transmission and/or reception at the DU when the soft T-F resource is not used for transmission and/or reception in the MT.

(3.3.5) Operation Example 4

In the above-described operation example, when the granularity of the frequency domain is RBG, the number of RBs included in each RB group (RBG size) may be predefined as the 3GPP specifications or may be configured by the CU 50 (may be the same as the configuration of the RBG for resource allocation in 3GPP TS38.214).

Also, in this case, the granularity in the time direction may be based on (similar to) the configuration of the semi-static H/S/NA.

When predefined as the 3GPP specifications, the RBG size may be different for each RBG according to the number of RBs included in a DU transmission band, or may be commonly applied to the plurality of RBGs.

Table 1 illustrates a configuration example of the DU transmission band and RBG size according to the operation example 4.

TABLE 1

| $N_{RB}$ of transmission bandwidth | Predefined value of RBG size |
|---|---|
| X1 | Y1 |
| X2 | Y2 |

"$N_{RB}$ of transmission bandwidth" is the number of RBs included in the DU transmission band. "Predefined value of RBG size" is a predefined RBG size. The values of X1, X2, Y1, and Y2 may be arbitrary. Further, Y1 and Y2 may have the same value or different values.

In addition, when configured by the CU 50, the configured value may be any of the following.

(Alt.1): The number of RBs included in each RBG is directly configured.
(Alt.2): The value mapped to the predefined RBG size is configured.

In addition, as described above, the predefined RBG size may be different for each RBG according to the number of RBs included in a DU transmission band, or may be commonly applied to the plurality of RBGs.

Table 2 illustrates another configuration example of the DU transmission band and the RBG size according to the operation example 4.

TABLE 2

| $N_{RB}$ of transmission bandwidth | Configured value | |
|---|---|---|
| | Configuration 1 | Configuration 2 |
| X1 | Y1 | Y3 |
| X2 | Y2 | Y4 |

As illustrated in Table 2, for example, in "configuration 1", when the $N_{RB}$ is X1, the RBG size is Y1. Y1, Y2, Y3, and Y4 are the predefined RBG size. Y1 and Y2 may have the same value or different values. Similarly, Y3 and Y4 may have the same value or different values.

(4) Action and Effect

According to the embodiment described above, the following actions and effects can be obtained. Specifically, the radio communication node 100B (IAB node) may receive the resource information indicating the type (H/S/NA) of DU resources allocated to the radio link configured via the DU function for the lower node (UE 200 or child node). Further, the radio communication node 100B can establish the radio link (child link) based on the resource information. Furthermore, when the frequency resource is the specific type (Soft (S)), the radio communication node 100B can receive the resource information indicating the availability (IA/INA) of the frequency resource.

Therefore, even when the frequency resources such as the Soft, which can be dynamically designated as available or not available, are used, the IAB node can determine whether to apply the DU resource, specifically, the frequency resource to the simultaneous transmission and reception with the MT using the FDM. By doing so, the IAB node can execute the appropriate simultaneous transmission and reception using the FDM in the MT and the DU.

In the present embodiment, the radio communication node 100B may receive the resource information indicating the availability of the time resource and the availability of the frequency resource. Therefore, the radio communication node 100B can quickly and reliably determine the type of time resource and the type of frequency resource.

In the present embodiment, the radio communication node 100B can repeatedly apply the availability (enabled, IA or INA) of the frequency resource in the time direction. Therefore, the IAB node can efficiently and quickly determine the availability of the dynamically configured soft frequency resource (or soft T-F resource).

In the present embodiment, the radio communication node 100B can receive the resource information indicating the availability of the frequency resource for each unit (symbol and the like) in the time direction. Therefore, the IAB node can accurately and quickly determine the availability of the soft frequency resource (or soft T-F resource) based on each time unit.

In the present embodiment, when the time resource is the Soft, the radio communication node 100B can receive the resource information indicating the availability of the frequency resource only in the unit in the time direction corresponding to the time resource. Therefore, the IAB node may indicate the availability of the resource while suppressing the amount of information (the number of bits) necessary for indicating the soft frequency resource (or soft T-F resource).

In the present embodiment, when the frequency resource of the soft is not allocated to the radio link (Link_parent) with the higher node (radio communication node 100A), the radio communication node 100B may allocate the frequency resource to the radio link (Link_child or DL Access/UL Access) with the lower node (child node or UE 200). Therefore, the radio communication node 100B can implicitly determine the availability of the soft frequency resource (or soft T-F resource) as the DU resource. As a result, the IAB node can reliably determine the availability of the soft frequency resource as the DU resource while suppressing the amount of information associated with the explicit indication of the soft frequency resource.

(5) Other Embodiments

Although the embodiment has been described hereinabove, it is obvious to those skilled in the art that the present disclosure is not limited to the description of the embodiment, and can be variously modified and improved.

Although the embodiment has been described hereinabove, it is obvious to those skilled in the art that the present disclosure is not limited to the description of the embodiment, and can be variously modified and improved.

For example, in the above-described embodiment, the names of the parent node, the IAB node, and the child node are used, but the above names may be different as long as the configuration of the radio communication node where the radio backhaul between the radio communication nodes such as gNB and the radio access with the terminal are integrated is adopted. For example, these nodes may be simply called the first and second nodes or the like, or may be called a higher node, a lower node, a relay node, an intermediate node, or the like.

In addition, the radio communication node may be simply called a communication device or a communication node, or may be read as a radio base station.

In the embodiments described above, the terms downlink (DL) and uplink (UL) are used, but the downlink (DL) and uplink (UL) may be called in other terms.

For example, the downlink (DL) and uplink (UL) may be replaced with or associated with terms such as a forward link, a reverse link, an access link, and backhaul. Alternatively, terms such as the first link, the second link, the first direction, the second direction, and the like may be simply used.

Moreover, the block diagram used for explaining the embodiments (FIGS. 3 and 4) illustrates blocks of functional unit. Those functional blocks (structural components) can be realized by a desired combination of at least one of hardware and software. In addition, a method for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting may be called a transmitting unit or a transmitter. In any case, as explained above, the realization method is not particularly limited to any one method.

Figure 15:
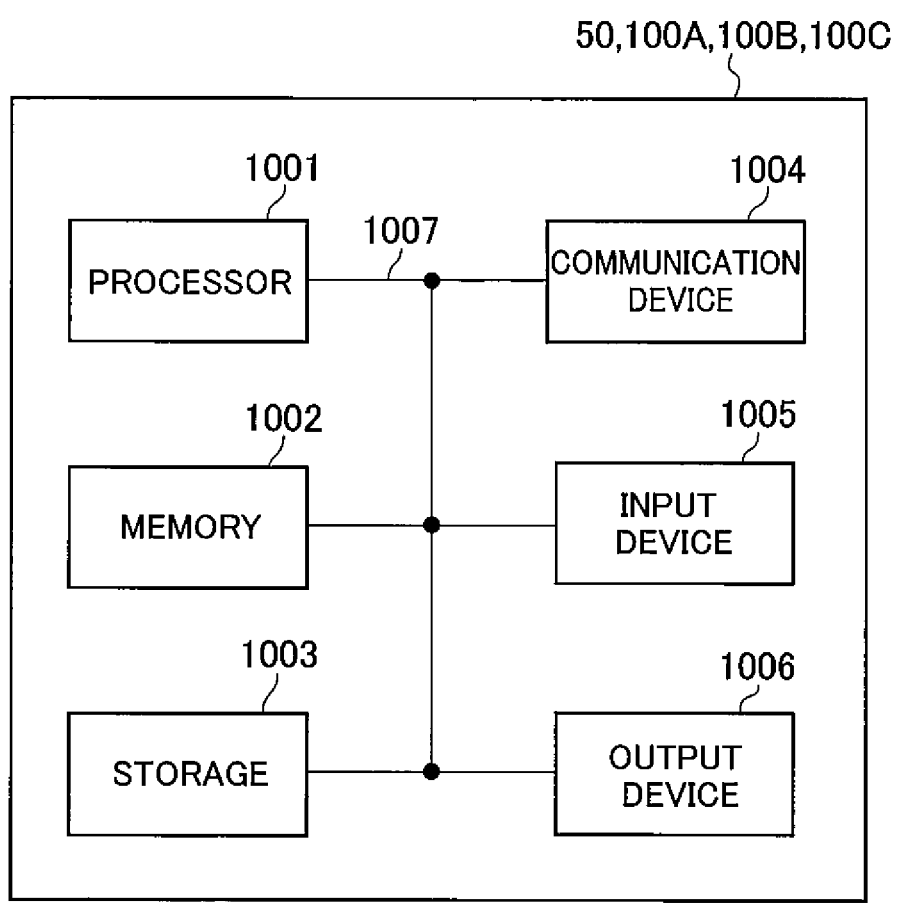
FIG. 15 is a diagram illustrating an example of a hardware configuration of a CU 50 and radio communication nodes 100A to 100C.

Further, the above-described CU 50 and the radio communication nodes 100A to 100C (device concerned) may function as a computer that performs processing of a radio communication method of the present disclosure. FIG. 15 is a diagram illustrating an example of a hardware configuration of the device. As illustrated in FIG. 15, the device can be constituted as a computer device including a processor 1001, a memory 1002, a storage 1003, a communication device 1004, an input device 1005, an output device 1006, a bus 1007, and the like.

Note that in the following explanation, the term "device" can be replaced with a circuit, device, unit, and the like. Hardware configuration of the device can be constituted by including one or plurality of the devices illustrated in the figure, or can be constituted by without including a part of the devices.

The functional blocks (see FIGS. 3 and 4) of the eNB 100A can be realized by any of hardware elements of the computer device or a desired combination of the hardware elements.

In addition, each function of the device performs computation by loading a predetermined software (computer program) on hardware such as the processor 1001 and the memory 1002, and realizes various functions of the eNB 100A by controlling communication via the communication device 1004 or controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

In addition, the processor 1001 reads a program (program code), a software module, data, and the like from at least one of the storage 1003 and/or the communication device 1004 into the memory 1002, and executes various processes according to the read program, software module, and data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Note that the program may be transmitted from a network via a telecommunication line.

The memory 1002 is a computer readable recording medium and is configured, for example, with at least one of read only memory (ROM), erasable programmable ROM (EPROM), electrically erasable programmable ROM (EEPROM), random access memory (RAM), and the like. The memory 1002 may be called register, cache, main memory (main storage device), and the like. The memory 1002 can store a program (program code), a software module, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 may be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network control unit, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be an integrated configuration (for example, a touch panel).

In addition, the respective devices, such as the processor 1001 and the memory 1002, are connected to each other with the bus 1007 for communicating information thereamong. The bus 1007 can be constituted by a single bus or can be constituted by separate buses between the devices.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

In addition, notification of information is not limited to that explained in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, notification information (Master Information Block (MIB), System Information Block (SIB)), other signals, or a combination of these. In addition, the RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its higher node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information and signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station.

A radio frame may be configured with one or a plurality of frames in a time domain. One frame or each of the plurality of frames in the time domain may be referred to as a subframe. The subframe may also be configured with one or a plurality of slots in the time domain. The subframe may have a fixed time length (for example, 1 ms) that does not depend on a numerology.

The numerology may be a communication parameter applied to at least one of transmission and reception of a certain signal or channel. The numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, a specific windowing processing performed by the transceiver in the time domain, and the like.

The slot may be configured with one or a plurality of symbols (Orthogonal Frequency Division Multiplexing (OFDM) symbols, Single Carrier Frequency Division Multiple Access (SC-FDMA) symbols, or the like) in the time domain. The slot may be a time unit based on a numerology.

The slot may include a plurality of minislots. Each minislot may be configured with one or a plurality of symbols in the time domain. In addition, the minislot may be referred to as a sub-slot. The minislot may be configured with a smaller number of symbols than that of the slot. A PDSCH (or PUSCH) transmitted in a time unit larger than the minislot may be referred to as PDSCH (or PUSCH) mapping type A. A PDSCH (or PUSCH) transmitted using the minislot may be referred to as PDSCH (or PUSCH) mapping type B.

All of the radio frame, the subframe, the slot, the minislot, and the symbol represent time units at the time of transmitting a signal. The radio frame, the subframe, the slot, the minislot, and the symbol may have different names corresponding thereto, respectively.

For example, one subframe may be referred to as a transmission time interval (TTI), a plurality of consecutive subframes may be referred to as a TTI, and one slot or one minislot may be referred to as a TTI. That is, at least one of the subframe and the TTI may be a subframe (1 ms) in the existing LTE, may be a period (for example, one to thirteen symbols) shorter than 1 ms, or may be a period longer than 1 ms. Note that a unit representing the TTI may be referred to as a slot, a minislot, or the like rather than the subframe.

Here, the TTI refers to, for example, a minimum time unit of scheduling in radio communication. For example, in an LTE system, a base station performs scheduling that allocates radio resources (frequency bandwidths, transmission power, and the like, that can be used in each user terminal) to each user terminal in a unit of the TTI. Note that a definition of the TTI is not limited thereto.

The TTI may be a transmission time unit of a channel-encoded data packet (transport block), a code block, a codeword, or the like, or may be a processing unit such as scheduling, link adaptation, or the like. Note that when the TTI is given, a time section (for example, the number of symbols) in which the transport block, the code block, the codeword, or the like is actually mapped may be shorter than the TTI.

Note that in a case where one slot or one minislot is referred to as the TTI, one or more TTIs (that is, one or more slots or one or more minislots) may be a minimum time unit of scheduling. In addition, the number of slots (number of minislots) constituting the minimum time unit of the scheduling may be controlled.

A TTI having a time length of 1 ms may be referred to as a usual TTI (TTI in LTE Rel. 8-12), a normal TTI, a long TTI, an usual subframe, a normal subframe, a long subframe, a slot, and the like. A TTI shorter than the normal TTI may be referred to as a shortened TTI, a short TTI, a partial or fractional TTI, a shortened subframe, a short subframe, a minislot, a subslot, a slot, and the like.

Note that the long TTI (for example, a normal TTI, a subframe or the like) may be replaced with a TTI having a time length exceeding 1 ms and the short TTI (for example, a shortened TTI or the like) may be replaced with a TTI having a TTI length shorter than that of the long TTI and having a TTI length of 1 ms or more.

A resource block (RB) is a resource allocation unit in the time domain and the frequency domain, and may include one or a plurality of continuous subcarriers in the frequency domain. The number of subcarriers included in the RB may be the same regardless of the numerology, and may be, for example, 12. The number of subcarriers included in the RB may be determined based on the numerology.

In addition, the time domain of the RB may include one or a plurality of symbols, and may have a length of one slot, one minislot, one subframe, or one TTI. One TTI, one subframe, and the like, may each be configured with one or a plurality of resource blocks.

Note that one or a plurality of RBs may be referred to as a physical resource block (Physical RB: PRB), a subcarrier group (Sub-Carrier Group: SCG), a resource element group (Resource Element Group: REG), a PRB pair, an RB pair, and the like.

In addition, the resource block may be configured with one or a plurality of resource elements (Resource Elements: RE). For example, one RE may be a radio resource area of one subcarrier and one symbol.

A bandwidth part (Bandwidth Part: BWP) (may be referred to as a partial bandwidth or the like) may represent a subset of contiguous common resource blocks (RBs) for a certain numerology in a certain carrier. Here, the common RB may be specified by an index of RBs based on a common reference point of the carrier. The PRB may be defined in a certain BWP and be numbered within the BWP.

The BWP may include an UL BWP and a DL BWP. For the UE, one or a plurality of BWPs may be configured in one carrier.

At least one of the configured BWPs may be active, and it may not be assumed that the UE transmits and receives a predetermined signal/channel outside the active BWP. Note that a "cell", a "carrier", or the like in the present disclosure may be replaced with the "BWP".

The structures of the radio frame, the subframe, the slot, the minislot, the symbol, and the like, described above are merely examples. For example, a configuration such as the number of subframes included in the radio frame, the number of slots per subframe or radio frame, the number of minislots included in the slot, the number of symbols and RBs included in the slot or the minislot, the number of subcarriers included in the RB, the number of symbols in the TTI, the symbol length, and the cyclic prefix (CP) length can be variously changed.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the radio frequency region, the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each of the above devices may be replaced with a "unit", a "circuit" a, "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as "a", "an", and "the" in English are added, in this disclosure, these articles shall include plurality of nouns following these articles.

The terms "determining" as used in this disclosure may encompass a wide variety of operations. The "determining" can include, for example, considering performing judging, calculating, computing, processing, deriving, investigating, looking up, search, or inquiry (for example, searching in a table, a database, or another data structure), or ascertaining as performing the "determining". In addition, the "determining" can include considering performing receiving (for example, receiving information), transmitting (for example, transmitting information), input, output, or accessing (for example, accessing data in a memory) as performing the "determining". In addition, the "determining" can include considering performing resolving, selecting, choosing, establishing, or comparing as performing the "determining". That is, the "determining" can include considering some operation as performing the "determining". In addition, the "determining" may be replaced with "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Radio communication system
50 CU
100A, 100B, 100C Radio communication node
110 Radio transmitting unit
120 Radio receiving unit
130 NW IF unit
140 IAB node connection unit
150 Control unit
161 Radio transmitting unit
162 Radio receiving unit
170 Higher node connection unit
180 Lower node connection unit
190 Control unit
UE 200
1001 Processor
1002 Memory
1003 Storage
1004 Communication device
1005 Input device
1006 Output device
1007 Bus

The invention claimed is:

1. A radio communication node, comprising:
a receiver configured to receive Downlink Control Information including resource information indicating availability of a soft resource allocated to a radio link with a lower node from a network; and
a processor configured to establish the radio link based on the resource information,
wherein the soft resource can designate availability of a resource block in a frequency direction; and
the processor determines whether all resources blocks are available or not as the soft resource when the soft resource is indicated as available.

2. The radio communication node according to claim 1, wherein the processor uses the resource block only when transmission to and reception from a higher node is not executed.

3. A radio communication node, comprising:
a receiver configured to receive Downlink Control Information including resource information indicating availability of a soft resource allocated to a radio link with a lower node from a network; and
a processor configured to establish the radio link based on the resource information,
wherein the soft resource can designate availability of a resource block in a frequency direction; and
the processor determines whether or not a group of resources blocks is available as the soft resource when the soft resource is indicated as available.

4. The radio communication node according to claim 3, wherein the processor uses the resource block only when transmission to and reception from a higher node is not executed.

5. A radio communication method comprising the steps of:
receiving Downlink Control Information including resource information indicating availability of a soft resource allocated to a radio link with a lower node from a network; and
establishing the radio link based on the resource information,
wherein the soft resource can designate availability of a resource block in a frequency direction; and
in the establishing step, whether all resources blocks are available or not as the soft resource is determined when the soft resource is indicated as available.

6. A radio communication method comprising the steps of:
receiving Downlink Control Information including resource information indicating availability of a soft resource allocated to a radio link with a lower node from a network; and
establishing the radio link based on the resource information,
wherein the soft resource can designate availability of a resource block in a frequency direction; and
in the establishing step, whether or not a group of resources blocks is available as the soft resource is determined when the soft resource is indicated as available.

* * * * *